(12) United States Patent
Seigler et al.

(10) Patent No.: US 12,688,873 B1
(45) Date of Patent: Jul. 21, 2026

(54) HEAT-ASSISTED MAGNETIC RECORDING HEADS WITH ADDITIONAL MAGNETIC MATERIAL

(71) Applicant: Seagate Technology LLC, Fremont, CA (US)

(72) Inventors: Michael Allen Seigler, Eden Prairie, MN (US); Weibin Chen, Bloomington, MN (US); Jianhua Xue, Maple Grove, MN (US); Jie Gong, Eden Prairie, MN (US); Joseph Roth, Minneapolis, MN (US); Tong Zhao, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 19/091,438

(22) Filed: Mar. 26, 2025

(51) Int. Cl.
  *G11B 5/73* (2006.01)
  *G11B 5/40* (2006.01)
  *G11B 5/48* (2006.01)

(52) U.S. Cl.
  CPC .............. G11B 5/7375 (2019.05); G11B 5/40 (2013.01); G11B 5/4866 (2013.01); *G11B 2220/2516* (2013.01)

(58) Field of Classification Search
  CPC ....... G11B 5/7375; G11B 5/40; G11B 5/4866; G11B 2220/2516
  See application file for complete search history.

(56) References Cited

U.S. PATENT DOCUMENTS

| | | | |
|---|---|---|---|
| 10,236,020 B2 | 3/2019 | Blaber et al. | |
| 10,403,315 B2 | 9/2019 | Matsumoto et al. | |
| 10,410,664 B1 | 9/2019 | Cheng et al. | |
| 10,490,215 B1 * | 11/2019 | Chen .................... | G11B 5/4866 |
| 10,490,221 B1 | 11/2019 | Chen | |
| 11,011,201 B2 | 5/2021 | Habibi et al. | |
| 11,380,354 B2 | 7/2022 | Peng | |
| 11,646,058 B1 | 5/2023 | Blaber et al. | |
| 11,710,502 B1 * | 7/2023 | Lee ...................... | G11B 5/3133 369/13.33 |
| 11,710,504 B1 | 7/2023 | Lee et al. | |
| 11,823,719 B1 * | 11/2023 | Peng .................... | G11B 7/1387 |
| 2014/0376352 A1 * | 12/2014 | Cheng ........................ | C22C 5/02 369/13.33 |
| 2022/0319542 A1 | 10/2022 | Puri et al. | |

* cited by examiner

*Primary Examiner* — Andrew Sasinowski
(74) *Attorney, Agent, or Firm* — Mueting Raasch Group

(57) ABSTRACT

Described are magnetic write heads for heat-assisted magnetic recording (HAMR) in which either or both of the heat sink disk or middle disk of the near field transducer are composed of magnetic materials. In addition, any diffusion barrier layers provided between the write pole and the heat sink or other components may include magnetic materials. Constructing write heads that include magnetic material containing components between the write pole and the near field transducer may result in increased areal density capability (ADC) due to lowering the magnetic field angle, decreasing the magnetic field rise time, and/or increasing the magnetic field strength.

20 Claims, 5 Drawing Sheets

1

HEAT-ASSISTED MAGNETIC RECORDING HEADS WITH ADDITIONAL MAGNETIC MATERIAL

TECHNICAL FIELD

The disclosure relates to magnetic writers, particularly for heat-assisted magnetic recording.

SUMMARY

In accordance with certain aspects, the present disclosure describes write heads for recording on magnetic media positioned proximate to a media facing surface. Such write heads include a write pole extending proximate to the media facing surface, a near field transducer disposed adjacent to the write pole and including an emitter disk disposed between a middle disk and a sunken disk, a peg extending from the emitter disk toward the media facing surface, and a waveguide configured to deliver electromagnetic radiation to the sunken disk for coupling into the emitter disk, and a heat sink disposed between the middle disk and the write pole. One or both of the heat sink and the middle disk is composed of a magnetic material. The magnetic material may be a FeCoX alloy, for example where X is Ni.

In certain aspects, the write heads may further include one or more diffusion barrier layers, for example disposed between the write pole and the heat sink, disposed between the heat sink and the middle disk, or disposed between the write pole and the near field transducer. In certain aspects, such diffusion barriers may be composed of magnetic materials such as FeCoX, where X is Ir, Pt, Pd, Rh, Ru, Re, or Os.

In certain aspects, the middle disk may be composed of FeCoIr. In certain aspects, the middle disk may be integrated with the write pole.

In certain aspects, the write pole may be a sloped write pole or a flat write pole. In certain aspects, the write pole may further include a peg coupler disposed on a tip of the write pole at the media facing surface.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
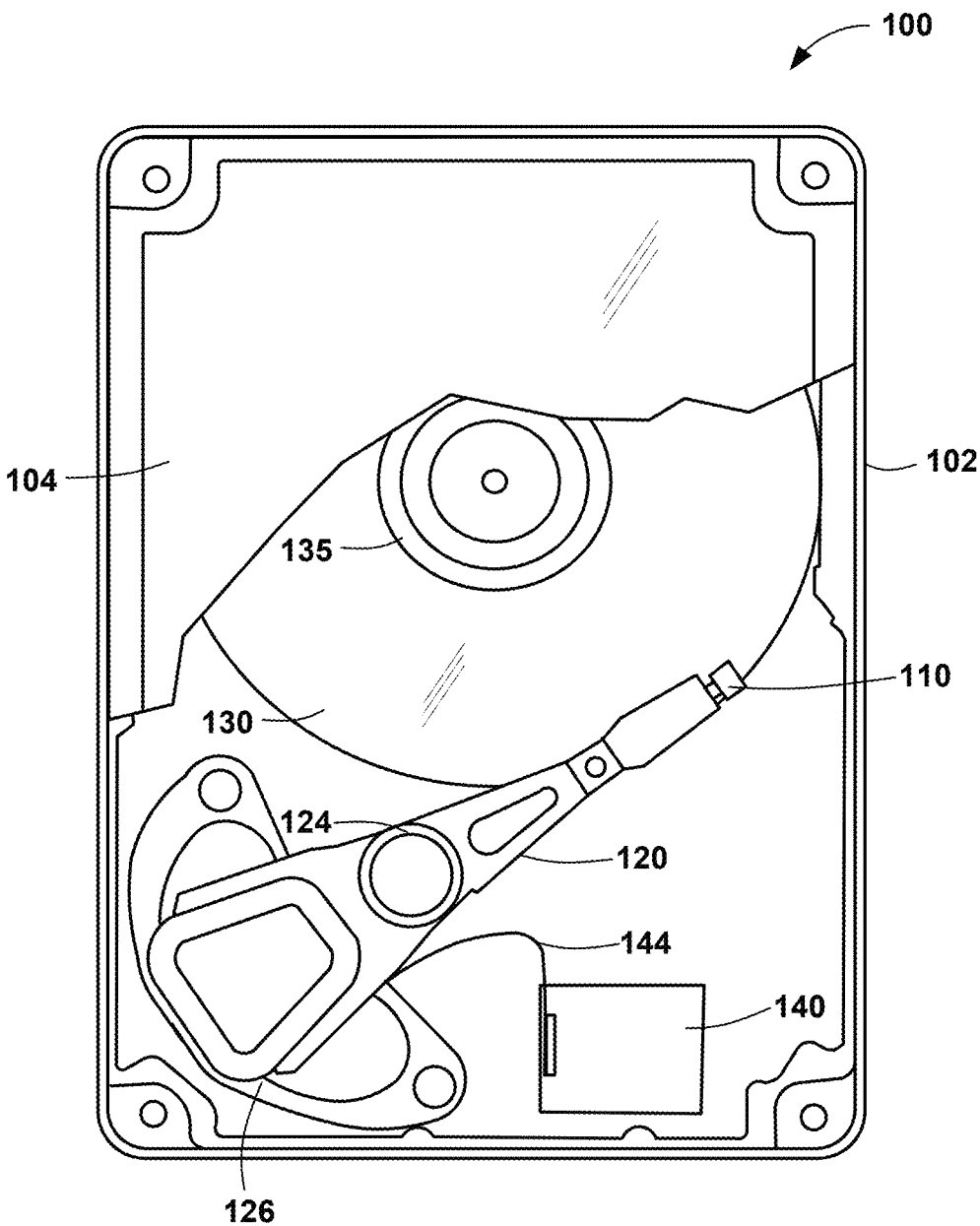
FIG. 1 is a schematic representation of a hard disk drive that may incorporate a magnetic writer in accordance with aspects of the present disclosure.

The present disclosure relates to magnetic write heads for heat-assisted magnetic recording (HAMR). In certain HAMR hard disk drive (HDD) writer designs, one or more heat sinks and other structures or layers are positioned between the write pole and portions of the near field transducer (NFT) at or near the media facing surface of the writer. These structures provide desirable properties, for example the heat sinks help protect the HAMR head components and the NFT from thermal degradation or damage. However, these structures, which are typically composed of nonmagnetic materials such as Au, Ir, Rh, and so forth, can create a separation between the magnetic materials of the write pole and the emitter portions of the NFT.

In accordance with various aspects of the present disclosure, it is recognized that beneficial effects to the writer magnetic field can result from including magnetic materials in HAMR writer components that reside near or around the NFT emitter peg. For example, a middle disk or a heat sink disk that is conventionally composed of Au may be replaced with a magnetic material. Other components such as diffusion barriers may also be composed of a magnetic material. Using magnetic materials for these conventionally nonmagnetic components may result in increased areal density capability (ADC) due to lowering the magnetic field angle, decreasing the magnetic field rise time, and/or increasing the magnetic field strength.

In accordance with the present disclosure, at least one of the middle disk, heat sink(s), and diffusion barrier(s) of a HAMR writer is formed of magnetic material, with the other components being made of either magnetic or nonmagnetic materials in various combinations. The inclusion of magnetic materials in certain HAMR writer components may enable writer design configurations that were previously difficult to fabricate. For example, the familiar sloped magnetic pole may be fashioned as a flat pole. In various aspects, the magnetic materials used may be FeCoX alloys, where X may be Ni or another suitable metal, whose composition is selected to control the saturation magnetization, coercivity, permeability, corrosion resistance, thermal conductivity, optical properties, and so forth. These magnetic materials may also include other metals added to control various material properties, such other metals including Cr, Cu, Ta, Nb, Zr, and so forth. It will be recognized that it may be beneficial to include a diffusion barrier between any remaining Au layers or components and the magnetic layers or components in constructions of the present disclosure.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding and are not meant to be scale drawings that accurately represent size or shape of elements.

FIG. 1 schematically depicts an example HDD device 100 that includes a recording head 110 having read and write capabilities. Recording head 110 is disposed on the end of an actuator arm 120 that is rotationally movable around a pivot 124 by use of a voice coil motor 126. Other driving and actuation mechanisms may be used, including piezoelectric motors, linear rail actuators, and so forth. The recording head 110 is positioned in close proximity to the surface of magnetic media disk 130 such that the recording head can write data to and read data from tracks on the magnetic media 130 as it spins by action of a spindle motor 135. Controller electronics 140 may be coupled to the voice coil motor 126 and recording head 110 via a flex cable 144 that connects to traces on the actuator 120. Preamp electronics (not indicated) are typically disposed close to the recording head 110 for conditioning signals to and from the recording head. Controller electronics 140 may also be communicatively coupled to spindle motor 135, and thereby control the spinning of the media disk(s) 130 along with the movement of the actuator 120 and the reading and writing of data via recording head 110.

The internal components of conventional HDD 100 are contained within an enclosure 102, including cover 104, which is shown partially cut away to reveal the internal components. The enclosure 102 may be sealed and filled with a desired atmosphere, such as helium gas, to create a controlled environment inside the HDD 100. A host device can communicate with conventional HDD 100 through a standardized interface (not shown). HDD 100 can operate on any magnetic recording principle, whether that be conventional magnetic recording (CMR), shingled magnetic recording (SMR), HAMR, or any other type of recording technique, including combinations thereof. Recording head 110 may include a magnetic writer that is provided in accordance with one or more aspects of the present disclosure.

Figure 2:
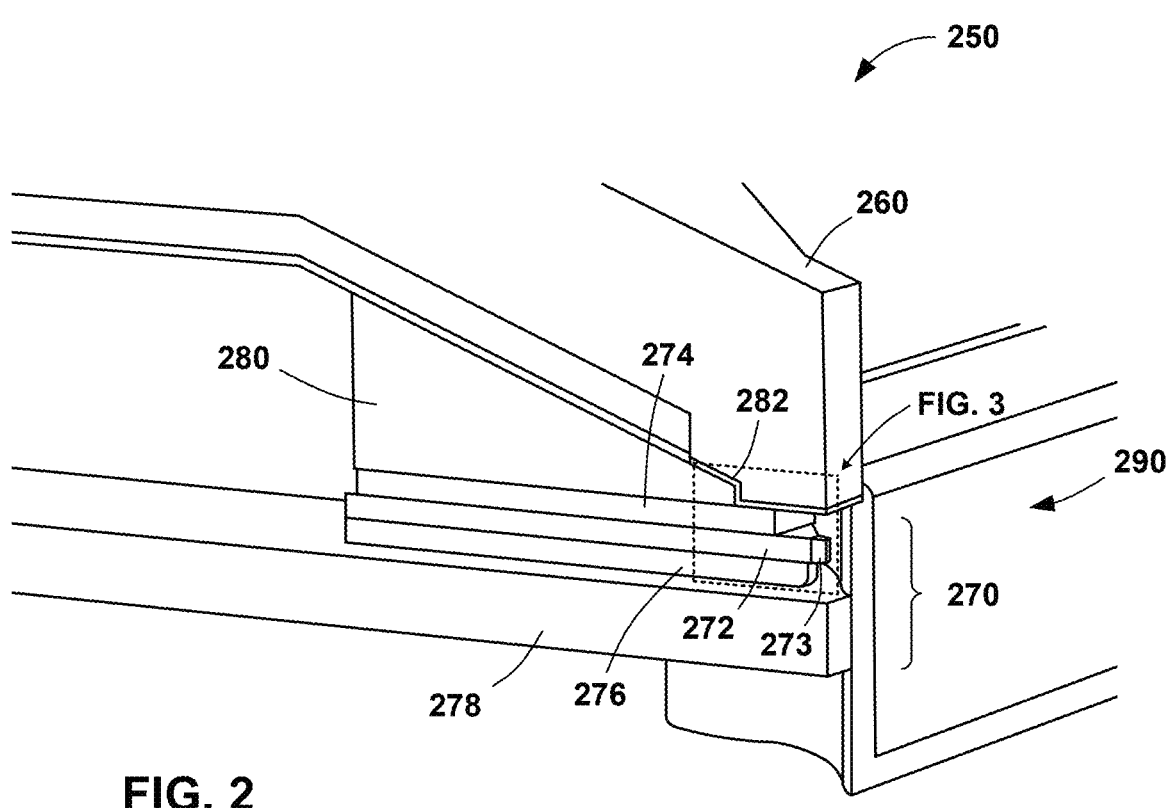
FIG. 2 is a schematic representation of a magnetic writer, illustrating various aspects of the present disclosure.

FIG. 2 shows a schematic perspective view of a HAMR writer 250 that includes a write pole 260 and an NFT 270 that extend to a media facing surface 290. The NFT 270 is constructed of an emitter 272 sandwiched between a middle disk 274 and a sunken disk 276. The emitter 272 includes a peg 273 that extends to the media facing surface 290 and is shaped to focus and direct plasmons toward the recording surface of the magnetic media. A waveguide 278 of the NFT 270 propagates electromagnetic radiation, for example emitted by a laser (not shown), that is delivered to the sunken disk 276 and then coupled into the emitter 272 for the excitation of plasmons. In a HAMR writer, the NFT is in essence a nanoscale "antenna" for directing evanescent fields from plasmon polaritons excited in the NFT at the media facing surface, thereby locally heating the recording media to reduce its coercivity, which allows the applied magnetic field to more easily change the magnetization of the media. This can allow for the use of small grain media with a larger magnetic anisotropy at room temperature to thereby enhance thermal stability of the recorded bits, which is desirable for recording at increased areal densities.

HAMR writer 250 includes a heat sink 280 that is positioned between the write pole 260 and the NFT 270 to thereby conduct heat away from the NFT 270 and the media facing surface 270. A barrier layer 282 may be formed between the heat sink 280 and the write pole 260, particularly when the heat sink 270 is made of material (such as Au) that could diffuse into and adversely affect the magnetic properties of the magnetic material of the write pole 260. Typical materials used for barrier layer 282 include Ir, Rh, and Ru, for example. The sunken disk 276 takes electromagnetic energy delivered by waveguide 278 and couples it into the emitter disk 272. The sunken disk 276 may be composed of Au, AuYO, Cu, Al, CuNi, and alloys of these materials, as well as Rh, Ir, and so forth. The emitter disk 272 may be composed of Ir, Rh, Au, IrRh, and so forth. Materials that may be used for a non-magnetic middle disk 274 include Ir, Rh, Au, Ir, Rh, and so forth. Materials that may be used for a non-magnetic heat sink disk 280 include Au, Cu, Al, Rh, Ir, and so forth. The write pole 260 may be composed of magnetic materials such as FeCo, FeCoNi, other FeCoX alloys, and so forth. A dashed box is drawn around a portion of the components of writer 250, to be illustrated in FIG. 3.

Figure 3:
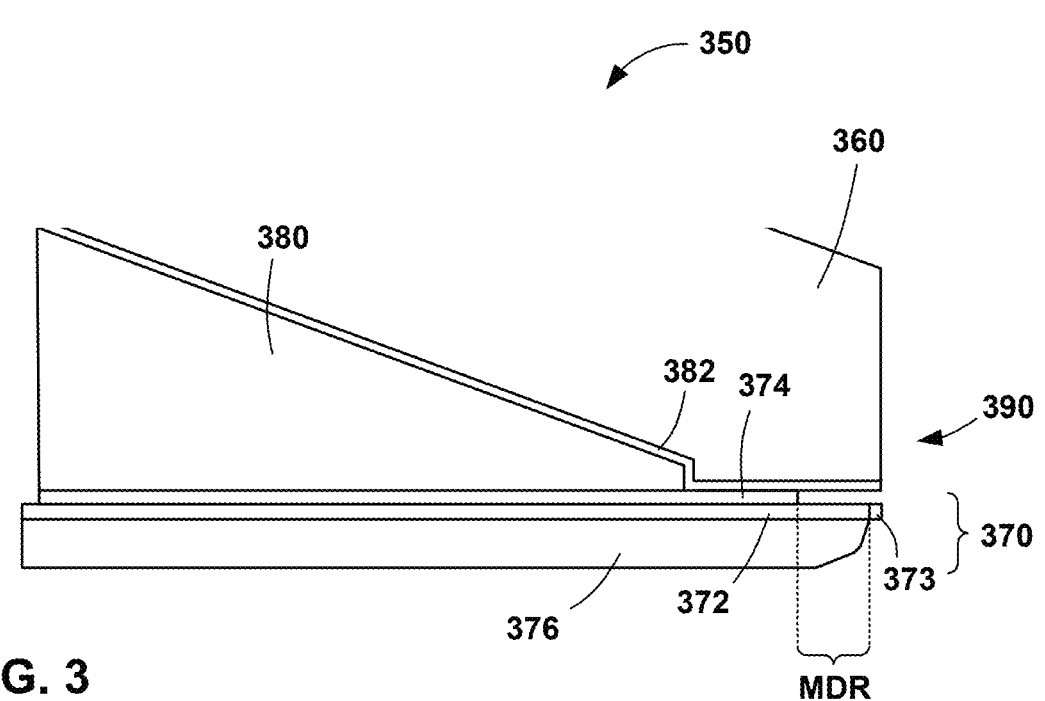
FIG. 3 is a schematic side view of a portion of the magnetic writer illustrated in FIG. 2.

FIG. 3 shows a schematic side view of a HAMR writer 350 that includes a write pole 360 and an NFT 370 that extend to a media facing surface 390. NFT 370 includes an emitter 372 between a middle disk 374 and a sunken disk 376. A peg 373 extends from the emitter 372 toward the media facing surface 390. The middle disk 374 is recessed from the base of the peg 373 by an amount MDR. A larger MDR can lead to higher ADC, but usually at the cost of increasing the temperature at the peg 373. Typical MDR distances may be in a range of about 35 nm or less to about 95 nm or more. Writer 350 further includes a heat sink 380 and a diffusion barrier 382. In accordance with various embodiments, one or more of the heat sink 380, middle disk 374, and barrier layer 383 may be composed of a magnetic material such as a FeCoX alloy, where X is optional and may be Ni or another suitable metal or metals. By replacing the non-magnetic material typically used for these components with a magnetic material, higher ADC and magnetic field performance may be obtained, even while maintaining an MDR that is sufficient to mitigate against high peg temperatures.

In certain embodiments where the middle disk 374 is composed of a magnetic material and the heat sink 380 is composed of Au or another non-magnetic material that can interfere with magnetic properties, a diffusion barrier layer may be deposited between the heat sink 380 and the middle disk 374. In certain embodiments, only the heat sink 380 is replaced with a magnetic material. In certain embodiments, both the heat sink 380 and the middle disk 374 are replaced with a magnetic material. In certain embodiments, all of the heat sink 380, middle disk 374, and diffusion barrier 382 are replaced with a magnetic material. In any of these embodiments, magnetic material can also be added to the sunken disk 376. For any writer construction in which Au is used for a component that abuts a magnetic material, it may be desirable to include a diffusion barrier layer between the Au component and the magnetic material. For writer constructions that include a magnetic diffusion barrier, the magnetic diffusion barrier may be composed of an FeCoX alloy where X is Ir, Pt, Pd, Rh, Ru, Re, or Os.

Figure 4A:
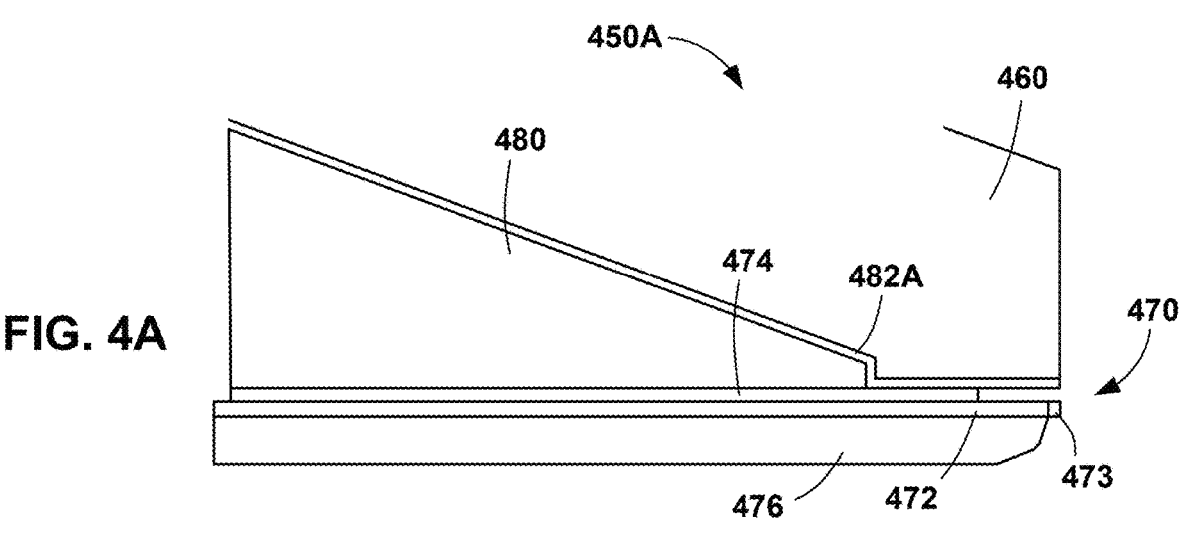
FIGS. 4A-C schematically illustrate various magnetic writer configurations in accordance with certain aspects of the present disclosure.
Figure 4B:
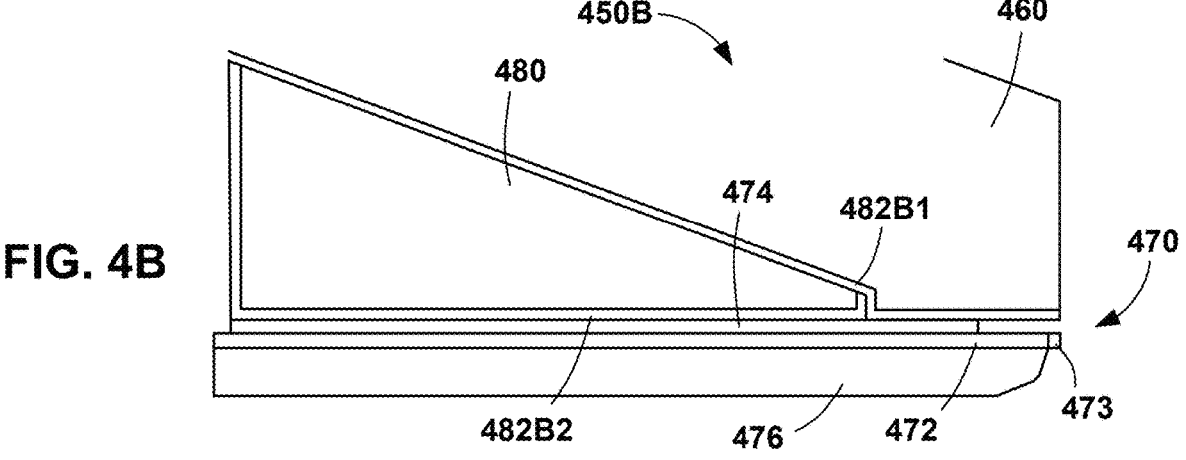
Figure 4C:
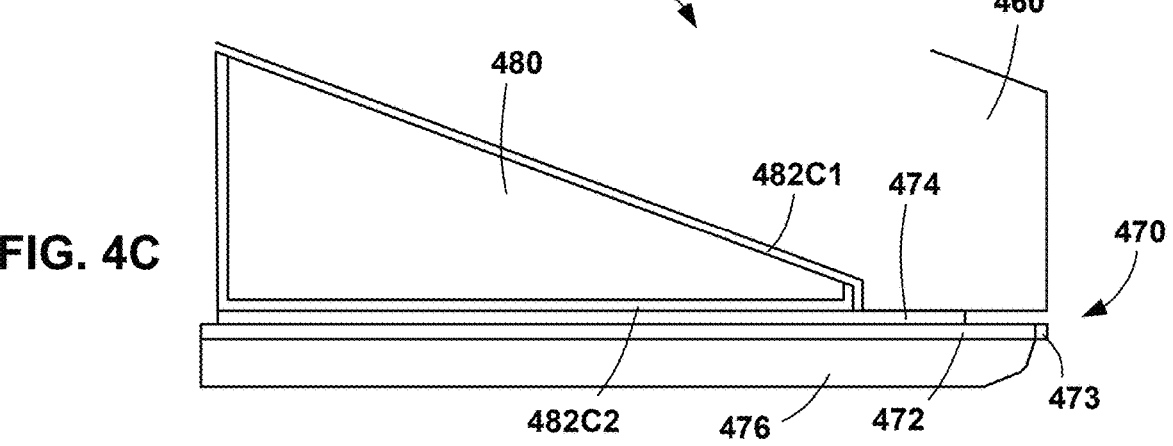

FIGS. 4A-C each show a schematic side view of a HAMR writer that includes a magnetic write pole 460 and an NFT 470 that extend to a media facing surface. NFT 470 includes an emitter 472 between a magnetic middle disk 474 and a sunken disk 476. The middle disk 474 is made of a magnetic material such as a FeCoX alloy, for example FeCoNi. A peg 473 extends from the emitter 472 toward the media facing surface. Each of FIGS. 4A-C also includes a heat sink 480 made of a non-magnetic material such as Au.

In FIG. 4A, the HAMR writer 450A includes a diffusion barrier 482A disposed between the non-magnetic heat sink 480 and the magnetic write pole 460. In certain aspects, the magnetic middle disk 474 may itself be a magnetic diffusion barrier, for example being composed of FeCoIr. As such, no diffusion barrier is needed between the non-magnetic heat sink 480 and the magnetic middle disk 474.

In FIG. 4B, the HAMR writer 450B includes a first diffusion barrier 482B1 disposed between the non-magnetic heat sink 480 and the magnetic write pole 460, and which extends along the write pole 460 toward the media facing surface. In addition, a second diffusion barrier 482B2 is wrapped around three sides of the non-magnetic heat sink 480 such that it is disposed between the non-magnetic heat sink 480 and the magnetic middle disk 474. This can help protect the magnetic middle disk 474 from diffusion of material from the non-magnetic heat sink 480.

In FIG. 4C, the HAMR writer 450C includes a first diffusion barrier 482C1 disposed between the non-magnetic heat sink 480 and the magnetic write pole 460. A second diffusion barrier 482C2 is wrapped around three sides of the non-magnetic heat sink 480 such that it is disposed between the non-magnetic heat sink 480 and the magnetic middle disk 474 to protect the magnetic middle disk 474 from diffusion of material from the non-magnetic heat sink 480. The first diffusion barrier 482C1 terminates at the end of the non-magnetic heat sink 480 and does not extend along the magnetic write pole 460. The absence of a diffusion barrier in this area means that the tip of the write pole 460 and the magnetic middle disk 474 are in contact, and decreases the distance between the tip of the write pole 460 and the peg 473.

Figure 5A:
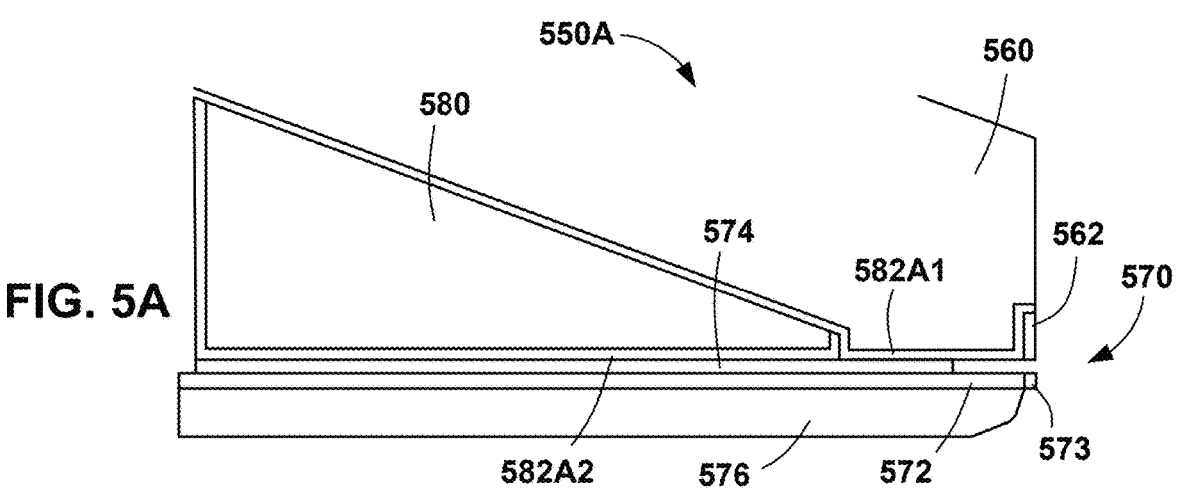
FIGS. 5A-C schematically illustrate various magnetic writer configurations in accordance with certain aspects of the present disclosure.
Figure 5B:
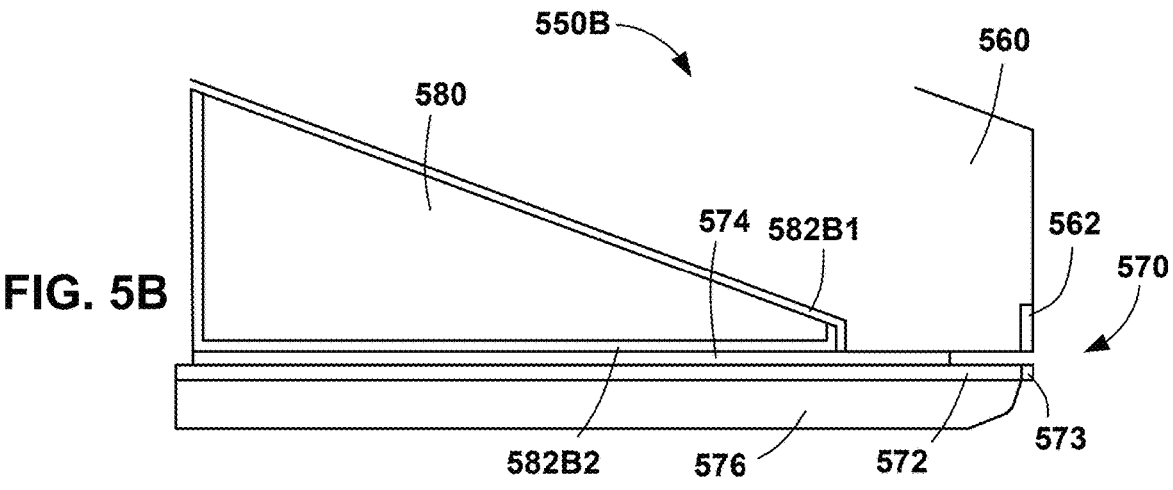
Figure 5C:
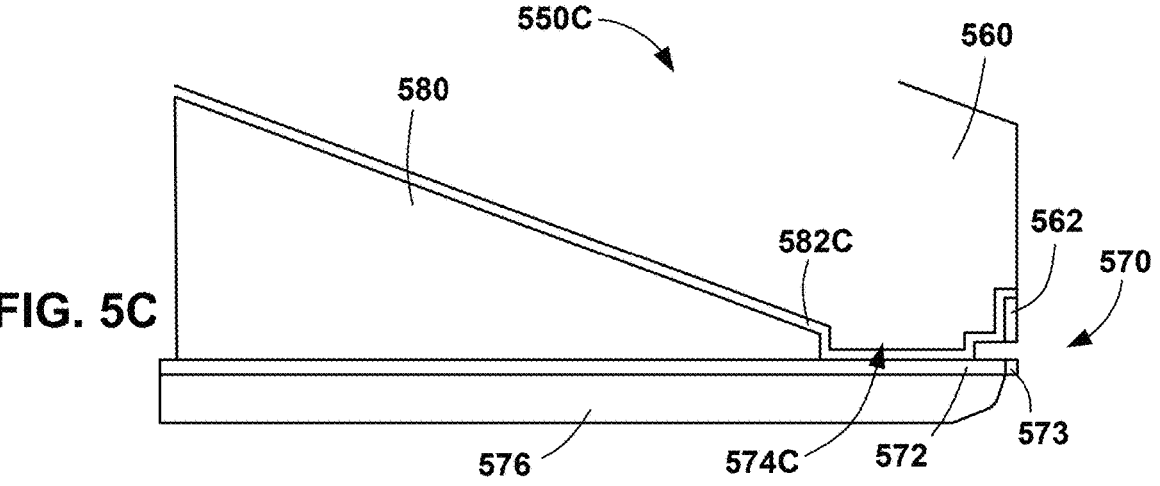

FIGS. 5A-C each show a schematic side view of a HAMR writer that includes a magnetic write pole 560 and an NFT 570 that extend to a media facing surface. NFT 570 includes an emitter 572 between a magnetic middle disk 574 and a sunken disk 576 (in FIG. 5C the middle disk 574C is formed as part of the write pole 560). The middle disk 574 and 574C is made of a magnetic material such as a FeCoX alloy, for example FeCoNi, and may be the same material as that of the write pole 560. A peg 573 extends from the emitter 572 toward the media facing surface. The magnetic write pole 560 incorporates a peg coupler 562 disposed at the tip of the write pole 560 and adjacent to the peg 573. Each of FIGS. 5A-C also includes a heat sink 580 made of a non-magnetic material such as Au.

In FIG. 5A, the HAMR writer 550A includes a first diffusion barrier 582A1 disposed between the non-magnetic heat sink 580 and the magnetic write pole 560, and which extends along the write pole 560 and wraps around peg coupler 562. A second diffusion barrier 582A2 is wrapped around three sides of the non-magnetic heat sink 580 such that it is disposed between the non-magnetic heat sink 580 and the magnetic middle disk 574.

The first diffusion barrier 582A1 may be a non-magnetic material or a magnetic material. For embodiments in which the first diffusion barrier 582A1 is a magnetic material, it may be composed of FeCoX, where X is Ir, Pt, Pd, Rh, Ru, Re, or Os present in an amount of about 5 at. % to about 30 at. %. Such a magnetic diffusion barrier may have a thickness of about 5 nm to about 100 nm. Moreover, the magnetic diffusion barrier may have an alloyed or layered construction, for example having a thin layer of Ir covered by a thicker layer of FeCoIr. The magnetic diffusion barrier may be plated from a seed layer or may be deposited by sputtering, ion beam deposition, evaporation, chemical vapor deposition, or the like. Deposition can take place from a single composite target or from multiple single-element or composite targets.

In FIG. 5B, the HAMR writer 550B includes a first diffusion barrier 582B1 disposed between the non-magnetic heat sink 580 and the magnetic write pole 560. The first diffusion barrier 582B1 does not extend past the end of the non-magnetic heat sink 580. A second diffusion barrier 582B2 is wrapped around three sides of the non-magnetic heat sink 580 such that it is disposed between the non-magnetic heat sink 580 and the magnetic middle disk 574.

The construction of FIG. 5B may be particularly useful when the first diffusion barrier 582B1 is non-magnetic.

In FIG. 5C, the HAMR writer 550C includes a diffusion barrier 582C disposed between the non-magnetic heat sink 580 and the magnetic write pole 560, and which extends along the write pole 560 and wraps around peg coupler 562. The diffusion barrier 582C may be a non-magnetic material or may incorporate a magnetic material. Absent in the construction of writer 550C is a separate middle disk layer. Instead a portion 574C of the write pole 560 extends toward the emitter 572 and acts as a "middle disk" 574C that is integrated with the write pole 560.

Figure 6A:
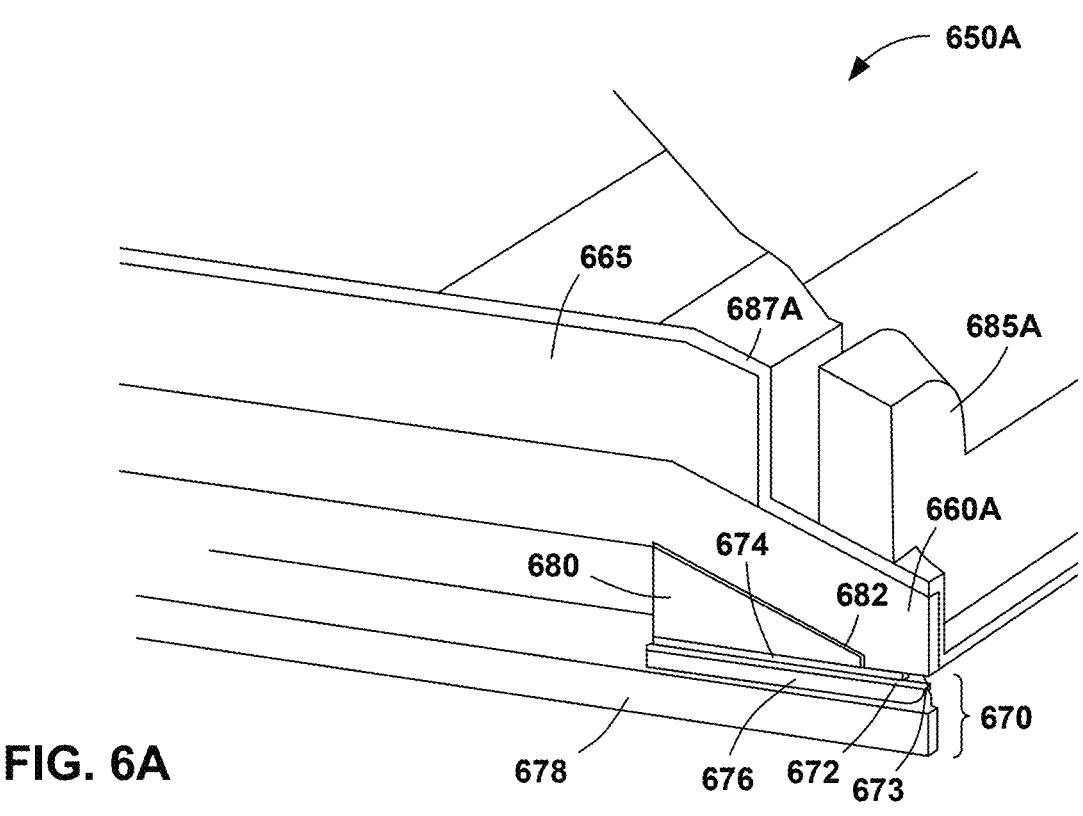
FIGS. 6A-B are schematic perspective views of magnetic writer configurations in accordance with certain aspects of the present disclosure.
Figure 6B:
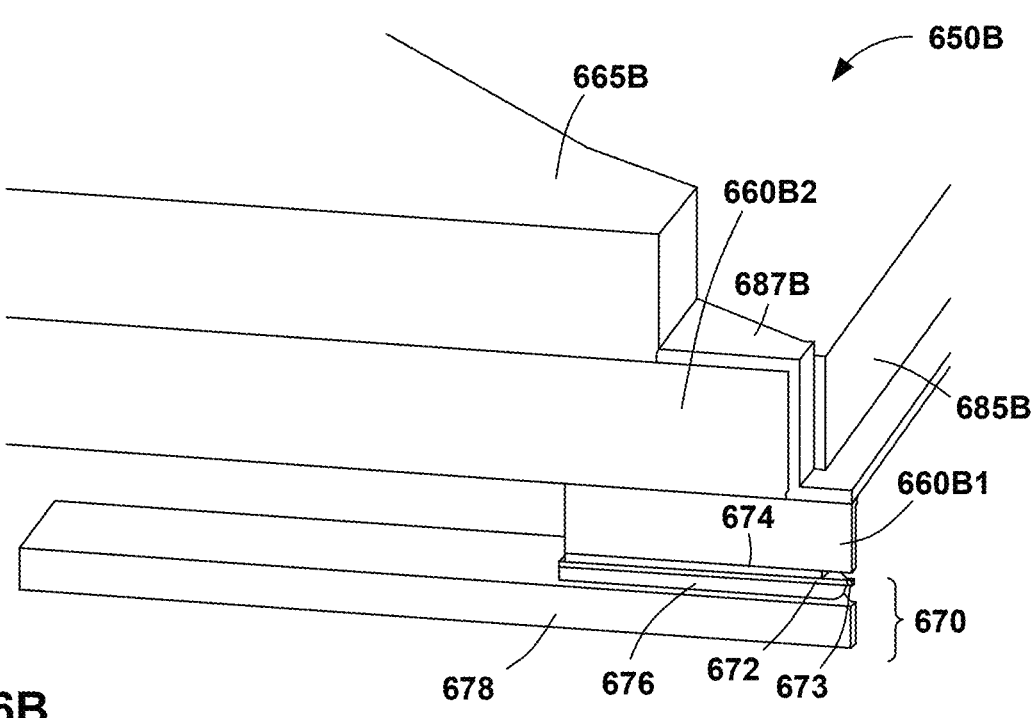

Using magnetic materials for HAMR writer components that are conventionally made with non-magnetic materials can enable simplification of writer constructions, as illustrated in FIGS. 6A-B. FIG. 6A schematically shows a perspective view of a sloped pole writer 650A. Writer 650A includes a write pole 660A that angles, or slopes, toward NFT 670 as the write pole 660A extends toward the media facing surface. A heat sink 680 is disposed between the sloped portion of the write pole 660A and the NFT 670. A diffusion barrier may be disposed between the heat sink 680 and the write pole 660A. The NFT 670 may include typical components such as an emitter 672 disposed between a middle disk 674 and a sunken disk 676, with a peg extending from the emitter 672 toward the media facing surface, and a waveguide 678. Writer 650A further includes a write pole yoke 665, an abutted heat channel 685A disposed around the tip of the write pole 660A and surrounding the yoke 665, and a diffusion barrier 687A to protect the magnetic material of write pole 660A and yoke 665 from diffusion of Au or other non-magnetic metal from the abutted heat channel 685A. As described in reference to various configurations of the present disclosure, the heat sink 680 and/or middle disk 674 may be composed of a magnetic material. In particular, the formation of heat sink 680 from magnetic material produces a construction that allows magnetic material to be brought close to the peg 673 even without sloping the write pole. Such a configuration is shown in FIG. 6B.

FIG. 6B schematically shows a perspective view of a flat pole writer 650B. Writer 650B includes a write pole that includes two flat portions, a flat write pole tip 660B1 and a flat write pole body 660B2. Because write pole tip 660B1 and write pole body 660B2 are flat, the fabrication of the write pole, and of writer 650B as a whole, can be greatly simplified. Write pole tip 660B1 extends toward the media facing surface adjacent to NFT 670. The NFT 670 includes an emitter 672 disposed between a middle disk 674 and a sunken disk 676, with a peg extending from the emitter 672 toward the media facing surface, and a waveguide 678. Writer 650B further includes a write pole yoke 665B disposed over write pole body 660B2, an abutted heat channel 685B disposed along the write pole body 660B2, and a diffusion barrier 687B between the abutted heat channel 685B and the write pole body 660B2.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (for example, all described acts or events may not be necessary to carry out the techniques).

All scientific and technical terms used herein have meanings commonly used in the art unless otherwise specified. The definitions provided herein are to facilitate understanding of certain terms used frequently herein and are not meant to limit the scope of the present disclosure.

As used herein, the term "configured to" may be used interchangeably with the terms "adapted to" or "structured to" unless the content of this disclosure clearly dictates otherwise.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality.

As used herein, any term related to position or orientation, such as "proximal," "distal," "end," "outer," "inner," and the like, refers to a relative position and does not limit the absolute orientation of an embodiment unless its context of usage clearly dictates otherwise.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. A write head for recording on magnetic media positioned proximate to a media facing surface of the write head, the write head comprising:
   a write pole extending proximate to the media facing surface;
   a near field transducer disposed adjacent to the write pole, the near field transducer comprising an emitter disk disposed between a middle disk and a sunken disk, a peg extending from the emitter disk toward the media facing surface, and a waveguide configured to deliver electromagnetic radiation to the sunken disk for coupling into the emitter disk; and
   a heat sink disposed between the middle disk and the write pole,
   wherein one or both of the heat sink and the middle disk is composed of a magnetic material.

2. The write head of claim 1, further comprising a diffusion barrier layer disposed between the write pole and the heat sink, the diffusion barrier layer configured to substantially prevent interdiffusion of materials between the write pole and the heat sink.

3. The write head of claim 1, further comprising a diffusion barrier layer disposed between the heat sink and the middle disk, the diffusion barrier layer configured to substantially prevent interdiffusion of materials between the heat sink and the middle disk.

4. The write head of claim 3, wherein the diffusion barrier is composed of a magnetic material.

5. The write head of claim 4, wherein the magnetic material of the diffusion barrier is FeCoX, where X is Ir, Pt, Pd, Rh, Ru, Re, or Os.

6. The write head of claim 1, wherein the magnetic material of one or both of the heat sink and the middle disk is an FeCoX alloy.

7. The write head of claim 6, wherein X is Ni.

8. The write head of claim 6, the FeCoX alloy further includes Cr, Cu, Ta, Nb, or Zr.

9. The write head of claim 1, wherein the middle disk is composed of FeCoIr.

10. The write head of claim 1, wherein the middle disk is integrated with the write pole.

11. The write head of claim 1, further comprising a diffusion barrier layer that extends between the write pole and the near field transducer.

12. The write head of claim 11, wherein the diffusion barrier is composed of a magnetic material.

13. The write head of claim 12, wherein the magnetic material of the diffusion barrier is FeCoX, where X is Ir, Pt, Pd, Rh, Ru, Re, or Os.

14. The write head of claim 1, wherein the write pole is a sloped write pole.

15. The write head of claim 1, wherein the write pole is a flat write pole.

16. The write head of claim 1, further comprising a peg coupler disposed on a tip of the write pole at the media facing surface.

17. A hard disk drive comprising the write head of claim 1.

18. A write head for recording on magnetic media positioned proximate to a media facing surface of the write head, the write head comprising:
   a write pole extending proximate to the media facing surface;
   a near field transducer disposed adjacent to the write pole, the near field transducer comprising an emitter disk disposed between a middle disk and a sunken disk, a peg extending from the emitter disk toward the media facing surface, and a waveguide configured to deliver electromagnetic radiation to the sunken disk for coupling into the emitter disk, where the middle disk is composed of a magnetic material; and
   a heat sink disposed between the middle disk and the write pole.

19. The write head of claim 18, wherein the middle disk is composed of an FeCoX alloy.

20. The write head of claim 18, further comprising a diffusion barrier layer disposed between the heat sink and the middle disk.

* * * * *